E. C. MAGOON.
COMBINED GARDEN HOE AND CULTIVATOR.
APPLICATION FILED OCT. 31, 1910.
1,003,481.
Patented Sept. 19, 1911.
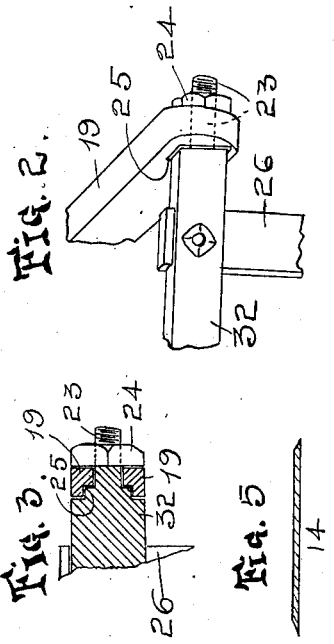
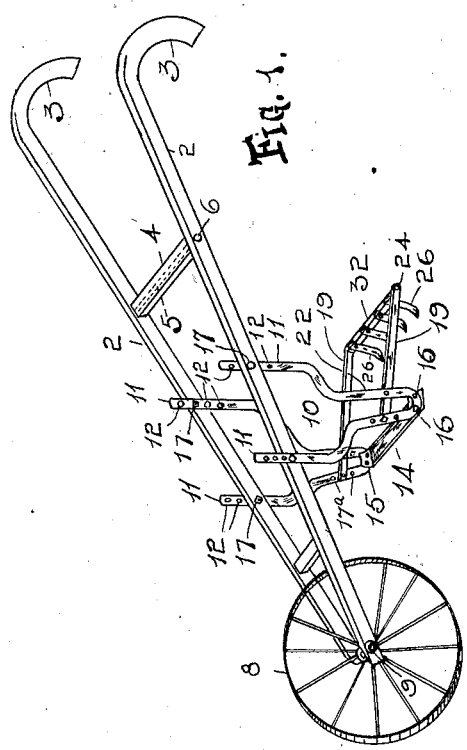
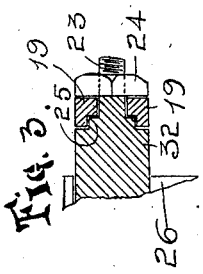
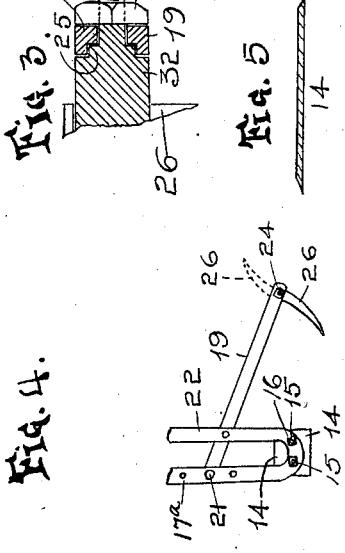
WITNESSES:
INVENTOR:
Edwin C. Magoon,
By H. M. Richards,
atty.
COLUMBIA PLANOGRAPH CO., WASHINGTON, D. C.

UNITED STATES PATENT OFFICE.

EDWIN C. MAGOON, OF GALESBURG, ILLINOIS, ASSIGNOR, BY MESNE ASSIGNMENTS, OF ONE-HALF TO JOSEPHINE P. LIEURANCE, OF GALESBURG, ILLINOIS.

COMBINED GARDEN HOE AND CULTIVATOR.

1,003,481. Specification of Letters Patent. Patented Sept. 19, 1911.

Application filed October 31, 1910. Serial No. 590,011.

*To all whom it may concern:*

Be it known that I, EDWIN C. MAGOON, a citizen of the United States, and a resident of Galesburg, in the county of Knox and State of Illinois, have invented a new and useful Combined Garden Hoe and Cultivator, of which the following is a specification.

While my invention relates primarily and particularly to implements used for loosening, stirring and cultivating the soil and for cutting off and raking the weeds from gardens and other relatively small plots of ground, and while I have illustrated and shall herein describe it as such, it will be evident, as its nature is more fully disclosed, that my improvements may, by slight and unessential changes, be embodied in horse-drawn implements and employed for like purposes in cultivating large fields. It will be understood also that without sacrificing any of the advantages of the invention it is susceptible of various changes in its details of construction, in its organization, and in the combinations of its elements.

In present day cultivation of gardens, and indeed, of fields of corn, cane, and other field products, the methods vary, the one generally prevailing, however, being that of surfacing or "skimming," which operation is performed by means of a blade which runs along approximately parallel with the surface of the ground. In certain conditions of the soil this is ineffective, because of the fact that sun-baked thin cakes or flakes will be cut from off the upper surface, pass rearwardly over the skimming-blade and be again deposited on the undisturbed soil immediately thereunder, the air being thereby excluded therefrom, the weeds undisturbed, and the roots having been neither cut off nor torn out.

It is an object of my invention to overcome this objectionable feature, and this I accomplish by means presently described.

To effect various novel relative arrangements and adjustments, both with relation to each other and of the elements *per se* constitutes another object of the invention.

To provide a reversible two-edged knife, either edge of which is adapted for use, constitutes still another of the objects.

To permit placement of certain of the elements in non-operative positions, or positions of rest, while others are occupying normal and operative ones, constitutes still another object.

That the elements constituting the means above recited be durable, strong, simple and effective, is a prime requisite; to provide such means for carrying out theses ends constitutes a further object.

Minor objects will be in part obvious and in part pointed out.

Coming now to a description of the drawing, in which my improvements are embodied in the best way now known to me: Figure 1 is a perspective, the parts being shown in intermediate adjustments; Fig. 2, a detail perspective, greatly enlarged, seen from the rear; Fig. 3, a detail, a longitudinal, vertical, central section, taken through the shovel-plate; Fig. 4, a detail, a side elevation; and Fig. 5, a transverse central sectional view of the horizontal portion only of the skimming-knife.

The reference numerals occurring in the following specification indicate like parts wherever they occur in the figures of the drawing just described.

2—2 represent divergent frame-bars, provided with curved handle portions 3—3 if preferred, although they may be lineal extensions if desired.

4 denotes a transverse spreader-bar, and 5 a binding-bolt, the latter passing through the former and through apertures in the bars 2, it being provided at one end with a head and at its other end with threads which engage a nut 6. A short transverse bar is shown, as is also a wheel 8 journaled on an axle 9. These parts are those of an ordinary construction of cultivator and require no further detailed description.

A pair of brackets 10 consisting of a U-shaped lower portion 22 having upwardly extended divergent portions 11 are pendent from the bars 2. The extensions 11 are provided with a series of apertures 12 for the reception of bolts 17 passed also through coinciding apertures in the bars 2. To adapt the device to the convenience of a tall person these bolts are positioned in the upper set of holes 12 whereby the skimming-blade 14 (presently described) is removed to a position remote from said bars, and, inasmuch as said blade is the support, the handle bars are consequently elevated to their highest operative positions. Other adjustments of this character will be obvious.

The knife 14 is preferably a piece of flat steel with both its front and rear edges sharpened, and is bent into a broadened U-shape. Its upturned ends are suitably apertured to receive short bolts 15 which pass through corresponding apertures in the lower portion of the bracket 10 and are engaged by nuts 16. The blade may be reversed, in an evident manner, when one edge becomes dull, and both edges be resharpened when both become dull. The forward and lower portion of each U-bracket is provided with a series of apertures 17$^a$, and the rear pair each with a single aperture. This arrangement may, of course, be reversed. A pair of drag-bars 19, each of which is provided with forward, rear, and intermediate apertures, are fulcrumed by means of bolts 20 passed through said intermediate apertures and through those in the rear portions of the bracket 10, while bolts 21 may be selectively positioned in the forward apertures, whereby the rear end portions of said bars may be adjusted relatively to the blade 14.

32 indicates a shovel-plate, preferably an oblong rectangle in its cross-section and having at each end a threaded trunnion 23 which engages a nut 24. The ends of said plate normally seat in correspondingly shaped recesses 25, one on the inner face of each drag-bar. By a slight turn of either nut 24 the plate may be freed from said recesses and axially reversed or turned to throw the shovels into the dotted line position shown, in which position the device may be used as a garden hoe alone, or the plate may be freed from the recesses and the inclination of the shovels (soon described) adjusted to any preferred operative position and held by means of the bolts and nuts which create sufficient friction of its shoulders to ordinarily hold it.

Secured at suitable intervals on the shovel-plate are shovels 26, preferably of the cultivator type. The means for and manner of adjusting them with relation to the blade 14 has been above described. Simultaneous adjustments of both the blade and shovels may be made by adjustment of the position of either the front or the rear pair of bracket arms 11, such adjustment being effected by means of the bolts 17.

For local transportation the device may be turned upside down, in which position it may be either drawn or pushed along after the fashion of a wheelbarrow.

The advantages of the numerous adjustments will at once be evident to those familiar with the art of agriculture. It is to be noted that the ground may be cultivated up to the very edge of the roots of growing plants, such as potatoes, onions, corn, cane, and so on. The surface soil will be lifted to any extent desired by the operator, this depending on the depth of penetration to which he holds the blade. In friable soil which is free from weeds and grass this blade will be all that is required, but when the soil is not of that character or not in that condition it becomes necessary to further pulverize it. The disposition of the shovels being closely in rear of said blade, the clods and flakes falling from off the latter will be picked up by the former, which, will strike the moist under surface thereof and effectually pulverize and evenly distribute them. The blade will either cut off or pull up most of the weeds and grass roots in its path, and these will be gathered by the shovels and dragged along until the operator desires to dump them. The shovel points are preferably set to agitate the subsoil, or soil which lies in a plane a little below that stripped or skimmed off by the blade 14, whereby such roots as have not been torn out by the knife will be so acted on by the shovel points, which further act to loosen the subsoil and put it in the most advantageous condition for penetration by air and moisture.

Having thus described my invention, I claim as new and desire to secure by Letters Patent the following, to-wit:—

1. A device of the character described comprising frame-bars, brackets pendent therefrom, a reversible skimming-knife secured to and between said brackets, and an axially reversible plate provided with cultivating teeth arranged in rear of said knife.

2. A device of the character described comprising frame-bars, brackets pendent therefrom, means whereby their forward or their rear portions may be raised and lowered with relation to each other, a skimming-knife secured to and between said brackets, and cultivator shovels arranged to be turned upwardly or downwardly in rear of said knife.

3. A device of the character described comprising a frame, brackets pendent therefrom, a skimming-knife secured to and between said brackets, drag-bars secured to and arranged in rear of said brackets, an axially reversible shovel-plate secured to said drag-bars, and shovels secured on said plate.

4. A device of the character described comprising frame-bars, brackets pendent therefrom, a skimming-knife secured to and between said brackets, drag-bars pivotally engaged with said brackets, means for locking them in selective adjustments, and an axially-reversible shovel-carrying plate drawn by said drag-bar, the shovels being thrown out of operative positions when said plate is reversed.

5. A device of the character described comprising frame-bars, brackets sustained thereby and adjustable with relation to their inclination and also bodily, a reversible skimming-knife secured to and between said brackets, and an axially-reversible shovel-carrying plate disposed in rear of said knife, the shovels being thrown out of operative positions when the plate is reversed.

6. A device of the character described comprising frame-bars, U-shaped brackets depending therefrom, a skimming-knife secured to the lower portion of said brackets, a drag-bar secured to each bracket, a shovel-plate pivotally mounted in the rear ends of said drag-bars, and cultivator-teeth carried by said plate, whereby when said plate is axially reversed the shovel-points will project upwardly.

7. A device of the character described comprising frame-bars, U-shaped brackets depending therefrom, a skimming-knife secured to the lower portion of said brackets, a drag-bar secured to each of said brackets, each of said drag-bars provided with an apertured recess at its rear end, a shovel-plate having a threaded trunnion at each end, said trunnions adapted for engagement with the apertures in said drag-bars, and the ends of the shovel-plate adapted to be restrained from pivotal movement by said recesses, and nuts threaded on said trunnions exterior to said drag bars.

8. A device of the character described comprising frame-bars, brackets pendent therefrom, a skimming-knife secured to the lower portion of said brackets, a drag-bar secured to each of said brackets and disposed in rear thereof, each of said drag-bars provided with an aperture at its rear end, a shovel-plate having a trunnion at each end, said trunnions disposed in said apertures whereby it is axially reversible, and means for locking said drag-bars in position.

9. A device of the character described comprising frame-bars, brackets pendent therefrom, a skimming-knife secured to the lower portion of said brackets, a drag-bar secured to each of said brackets and disposed in rear thereof, each of said drag-bars provided with an aperture at its rear end, means for locking said bars in position, a shovel-plate having a trunnion at each end, said trunnions disposed in said apertures whereby it is axially reversible, and means for locking said shovel-plate in position.

In witness whereof I hereunto affix my signature this 18th day of October, 1910.

EDWIN C. MAGOON.

Witnesses:
WEBB A. HERLOCKER,
M. F. MORRISSEY.

Copies of this patent may be obtained for five cents each, by addressing the "Commissioner of Patents, Washington, D. C."